United States Patent
Guechai et al.

(10) Patent No.: US 10,974,721 B2
(45) Date of Patent: Apr. 13, 2021

(54) METHOD FOR AVOIDING A COLLISION OF A MOTOR VEHICLE WITH AN OBJECT ON THE BASIS OF A MAXIMUM SPECIFIABLE WHEEL STEERING ANGLE, DRIVER ASSISTANCE SYSTEM, AND MOTOR VEHICLE

(71) Applicant: Valeo Schalter und Sensoren GmbH, Bietigheim-Bissingen (DE)

(72) Inventors: Wael Guechai, Bietigheim-Bissingen (DE); Christos Maraslis, Bietigheim-Bissingen (DE); Stefanie Prinzhausen, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 88 days.

(21) Appl. No.: 16/305,944

(22) PCT Filed: May 24, 2017

(86) PCT No.: PCT/EP2017/062533
§ 371 (c)(1),
(2) Date: Nov. 30, 2018

(87) PCT Pub. No.: WO2017/207384
PCT Pub. Date: Dec. 7, 2017

(65) Prior Publication Data
US 2019/0299982 A1  Oct. 3, 2019

(30) Foreign Application Priority Data

May 30, 2016  (DE) ..................... 10 2016 109 856.6

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 10/20* (2013.01); *B60W 50/16* (2013.01);
(Continued)

(58) Field of Classification Search
CPC ...... B60W 30/09; B60W 50/16; B60W 10/20; B60W 10/18; B60W 2710/207;
(Continued)

(56) References Cited

U.S. PATENT DOCUMENTS 5,477,461 A * 12/1995 Waffler ................. G01S 17/931
701/301
7,617,048 B2 * 11/2009 Simon ................... G01S 13/931
701/301

(Continued)

FOREIGN PATENT DOCUMENTS

DE  10 2005 023832 A1  11/2006
DE  10 2008 049824 A1  4/2010

(Continued)

OTHER PUBLICATIONS

International Search Report issued in PCT/EP2017/062533 dated Jul. 28, 2017 (3 pages).

(Continued)

*Primary Examiner* — Michael C Zarroli
(74) *Attorney, Agent, or Firm* — Osha Bergman Watanabe & Burton LLP (57) ABSTRACT

A method is described for avoiding a collision of a motor vehicle with an object. A relative position between the motor vehicle and the object is determined. Depending on the relative position between the motor vehicle and the object, at least one collision avoidance measure is determined. A maximum specifiable steering angle range is determined. Within the maximum specifiable steering angle range, a (Continued)

blocked steering angle range, for which the collision with the object is threatened and preventable, and a warning steering angle range, for which no collision with the object is threatened and which is adjacent to the blocked steering angle range, are determined on the basis of the relative position between the motor vehicle and the object. A first collision avoidance measure for the blocked steering angle range and a second collision avoidance measure for the warning steering angle range are determined.

10 Claims, 5 Drawing Sheets

(51) Int. Cl.
*B60W 10/20* (2006.01)
*B60W 50/16* (2020.01)
*B60W 50/14* (2020.01)

(52) U.S. Cl.
CPC . *B60W 2050/143* (2013.01); *B60W 2050/146* (2013.01); *B60W 2540/18* (2013.01); *B60W 2710/18* (2013.01); *B60W 2710/207* (2013.01)

(58) Field of Classification Search
CPC ......... B60W 2710/18; B60W 2540/18; B60W 2050/146; B60W 2050/143
See application file for complete search history.

(56) References Cited

U.S. PATENT DOCUMENTS

| | | | | |
|---|---|---|---|---|
| 7,893,819 B2* | 2/2011 | Pfeiffer | ................ | B60Q 9/008 340/435 |
| 8,762,043 B2* | 6/2014 | Eidehall | ............. | B62D 15/0265 701/301 |
| 8,788,176 B1* | 7/2014 | Yopp | ................... | B60W 30/162 701/96 |
| 9,105,190 B2* | 8/2015 | Akiyama | ........... | B62D 15/0265 |
| 9,174,641 B2* | 11/2015 | Fritz | ................. | B60W 30/0956 |
| 9,862,410 B2* | 1/2018 | Oyama | .................. | B62D 6/005 |
| 2008/0208408 A1* | 8/2008 | Arbitmann | ............ | B60W 40/10 701/41 |
| 2013/0124041 A1* | 5/2013 | Belser | ................ | B62D 15/0285 701/41 |
| 2015/0073662 A1* | 3/2015 | Schmudderich | ...... | B60W 30/16 701/41 |

FOREIGN PATENT DOCUMENTS

| | | |
|---|---|---|
| DE | 10 2011 100615 A1 | 11/2012 |
| DE | 10 2012 008660 A1 | 11/2012 |
| DE | 10 2012 010130 A1 | 12/2012 |
| DE | 10 2013 223377 A1 | 6/2015 |
| EP | 2 087 478 B1 | 1/2011 |
| EP | 2 887 335 A1 | 6/2015 |
| JP | 2009298355 A | 12/2009 |
| WO | WO-2016189112 A1 * | 12/2016 ............ B60W 40/04 |

OTHER PUBLICATIONS

Written Opinion of the International Searching Authority issued in PCT/EP2017/062533 dated Jul. 28, 2017 (6 pages).
German Search Report issued in DE 10 2016 109 856.6 dated Jan. 27, 2017 (14 pages).
Notification of Reason for Rejection in corresponding Japanese Application No. 2018-562532, dated Feb. 7, 2020 (6 pages).

* cited by examiner

METHOD FOR AVOIDING A COLLISION OF A MOTOR VEHICLE WITH AN OBJECT ON THE BASIS OF A MAXIMUM SPECIFIABLE WHEEL STEERING ANGLE, DRIVER ASSISTANCE SYSTEM, AND MOTOR VEHICLE

BRIEF SUMMARY OF THE INVENTION

The present invention relates to a method for avoiding a collision of a motor vehicle with an object, in which the object is detected in an environment of the motor vehicle, a relative position between the motor vehicle and the object is determined, and depending on the relative position between the motor vehicle and the object at least one collision avoidance measure is determined. In addition, the present invention relates to a driver assistance system for a motor vehicle. Finally, the present invention relates to a motor vehicle having such a driver assistance system.

In the present case, the area of interest relates to driver assistance systems, which are designed to assist a driver of the vehicle to drive the motor vehicle. Such a driver assistance system can be used, for example, to avoid a collision between the motor vehicle and an object on a trajectory of the motor vehicle. To do so, the driver assistance system can be designed, for example, as an automatic emergency braking system, which automatically slows down the motor vehicle if a collision with the object is imminent. In addition, driver assistance systems are known which intervene in the steering so that the object can be avoided.

In addition, methods are known from the prior art for determining a risk of collision which describes a possible collision between the motor vehicle and the object. Depending on the result of this, collision avoidance measures can be initiated to prevent the collision or reduce the severity of the collision. Such collision avoidance measures can include, for example, braking interventions, warnings, active steering interventions or passive steering prompts.

To date, known collision avoidance methods usually only consider objects that are in a driving envelope. Such a driving envelope describes, for example, an area on the road which the vehicle will occupy in the future. The driving envelope can be determined as a function of a current steering angle of the motor vehicle. Usually, only objects in the driving envelope that represent a direct risk of collision are considered.

In this connection, EP 2 887 335 A1 describes a method for warning a driver of a motor vehicle before a risk of collision by issuing a non-optical warning signal. In particular, an audible and/or a haptic warning signal can be emitted. In this method a current steering angle of the motor vehicle is detected and depending on the current steering angle and in particular taking account of vehicle dimensions, a virtual driving envelope can then be determined. If an object is located in this virtual driving envelope, the non-visual warning can be issued.

In addition, EP 2 087 478 B1 describes a method for collision avoidance between vehicles and objects. The method involves measuring the distance from objects arranged outside of the vehicle to sensors mounted on the vehicle. In addition, a driving route is determined based on the current speed of the motor vehicle and the steering direction. In addition, it is determined whether the vehicle will collide with an object detected by the sensors by following the specified path. If there is a risk of collision, an appropriate display can be output in the vehicle.

The object of the present invention is to indicate a solution to the problem of how a collision between a car and an object can be reliably prevented.

This object is achieved according to the invention by means of a method, by a driver assistance system and by a motor vehicle having the features in accordance with the respective independent claims. Advantageous embodiments of the invention are the subject matter of the dependent claims.

In one embodiment of a method for avoiding a collision of a motor vehicle with an object, the object is detected in an environment of the motor vehicle. In addition, a relative position between the vehicle and the object is preferably determined. In addition, at least one collision-avoidance measure is determined, in particular depending on the relative position between the motor vehicle and the object. Furthermore, a maximum specifiable steering angle range is preferably determined. In addition, on the basis of the relative position between the motor vehicle and the object, preferably within the specifiable steering angle range, a blocked steering angle range is determined for which the collision with the object is threatened and avoidable, and a warning steering angle range is determined, for which no collision with the object is threatened and which is adjacent to the blocked steering angle range. In addition, a first collision avoidance measure for the blocked steering angle range and a second collision avoidance measure for the warning steering angle range are preferably determined.

In a method according to the invention for avoiding a collision of a motor vehicle with an object, the object is detected in an environment of the motor vehicle. In addition, a relative position between the motor vehicle and the object is determined and, depending on the relative position between the motor vehicle and the object, at least one collision avoidance measure is determined. Furthermore, a maximum specifiable steering angle range is determined. In addition, in the maximum specifiable steering angle range, on the basis of the relative position between the motor vehicle and the object a blocked steering angle range is determined, for which the collision with the object is threatened and avoidable, and a warning steering angle range is determined for which no collision with the object is threatened and which is adjacent to the blocked steering angle range. A first collision avoidance measure is determined for the blocked steering angle range and a second collision avoidance measure is determined for the warning steering angle range.

The purpose of the method is to avoid a collision between the motor vehicle and the object or at least to reduce the severity of a collision. To this end, in the environment of the motor vehicle at least one object is detected. This can be effected, for example, with appropriate sensors of the motor vehicle, for example ultrasonic sensors, radar sensors, laser scanners, lidar sensors or cameras. It is also possible, for example, that the detected objects are entered into a digital environment map, which describes the environment of the motor vehicle. Thus, the relative position between the vehicle and the object can be determined. In addition, the relative position between the motor vehicle and the object can be determined during the movement of the motor vehicle or while driving. On the basis of the relative position it can then be monitored whether there is a risk of collision between the motor vehicle and the object. This is the case, for example, if a distance between the motor vehicle and the object falls below a predetermined minimum distance. If the threat of a collision between the vehicle and the object has been detected, the collision avoidance measure can be initiated. This collision avoidance measure may then be used to attempt to prevent the collision.

According to the invention it is then provided that a maximum specifiable steering angle range is determined. To this end, the bilateral steering angles of the wheels which can be maximally specified for the current driving situation of the motor vehicle are determined. The maximum steering angle describes the deflections of the steerable wheels of the motor vehicle. By specifying the steering angles, the motor vehicle can be driven round a bend. These maximum specifiable steering angles for the two sides, thus for a clockwise rotation and a counter-clockwise rotation, do not correspond to the maximum possible steering angles. In other words, the maximum specifiable steering angles are by definition those steering angles which are set at full steering lock in each direction and which are used to define the turning circle of the motor vehicle as the smallest possible circular path. The maximum specifiable steering angles are instead those steering angles which are currently feasible and permissible for the motor vehicle, for example, taking account of the current speed of the motor vehicle. The maximum specifiable steering angle range describes the range between the two maximum specifiable steering angles.

On the basis of this maximum specifiable steering angle range and the relative position between the vehicle and the object, the maximum specifiable steering angle range is now more precisely defined. Within the maximum specifiable steering angle range a blocked steering wheel angle range is determined. This blocked steering angle range describes those steering angles, the setting of which threatens to cause a collision with the object. If the current steering angle of the motor vehicle therefore lies within this blocked steering angle range, a collision with the object will take place if no collision avoidance measure is carried out. For example, the collision with the object can be prevented by a steering intervention or braking. The blocked steering angle range can describe the range in which the collision between the vehicle and the object can still be avoided. In particular, this blocked steering angle range can describe a range in which the collision can be avoided by setting the maximum specifiable steering angle. In addition, in the maximum specifiable steering angle range a free steering angle range can be defined, for which there is no risk of collision with the object. Thus, if the current steering angle of the motor vehicle is in the free steering angle range, there is a high probability that no collision with the object will occur. Between the free steering angle range and the blocked steering angle range, a warning steering wheel angle range is defined. For steering angles which lie within this warning steering angle range, there is no risk of a collision between the vehicle and the object. The warning steering angle range describes, for example, steering angles the setting of which means that the vehicle will pass very close to the object. If the current steering angle is within the warning steering angle range, a very slight change in the steering angle or the steering wheel angle can lead to a collision with the object.

In comparison to the prior art therefore, here it is not the current or actual steering angles but rather fixed steering angle ranges that are used to determine a risk of collision. It is further provided that a first collision avoidance measure is determined for the blocked steering angle range and a second collision avoidance measure is determined for the warning steering angle range. In particular, the first collision avoidance measure differs from the second collision avoidance measure. A possible result of this, for example, is that the collision between the motor vehicle and the object is avoided if the current steering angle is within the blocked steering angle range. If the current steering angle is within the warning steering angle range, the driver of the motor vehicle can be informed that a change in the steering angle into the blocked steering angle range will lead to a collision with the object.

Preferably, the maximum specifiable steering angle range is determined on the basis of a predetermined reaction time and/or on the basis of a current speed of the motor vehicle. The maximum specifiable steering angle range describes in particular the range of steering angles which can be set in the current driving situation of the motor vehicle. In order to determine the maximum specifiable steering angle range, a predetermined reaction time of a driver of the vehicle can be used. The reaction time can also describe a response time of the driver assistance system. The reaction time describes the period of time between the detection of the object and the beginning of a collision avoidance measure. The current driving direction of the motor vehicle and a corresponding driving envelope can also be determined, which describes the future movement of the motor vehicle. To determine the maximum specifiable steering angle range it is also possible to determine which virtual objects in this driving envelope can be avoided, taking into account the reaction time. In addition, the maximum specifiable steering angle range can be determined on the basis of the current speed of the motor vehicle. For example, the maximum specifiable steering angle range may be defined such that the driving stability is always guaranteed. This allows a reliable determination of the maximum specifiable steering angle range.

In one embodiment a braking and/or steering intervention is determined as the first collision avoidance measure, and the first collision avoidance measure is initiated if a current steering angle lies within the blocked steering angle range. If the current steering angle lies within the predetermined blocked steering angle range and/or a collision can be avoided by setting a maximum specifiable steering angle, the first collision avoidance measure can be initiated. In the first collision avoidance measure the motor vehicle brakes can be activated or an intervention in the steering can be performed. In doing so, the braking force can be adjusted depending on the current speed of the motor vehicle and/or the relative position between the motor vehicle and the object. The result that may be achieved, for example, is that the vehicle is braked to a standstill before reaching the object and thus the collision is avoided. Alternatively or additionally, it is possible to intervene in the steering of the motor vehicle such that the current steering angle is within the free steering angle range or the warning steering angle range. In the blocked steering angle range a collision between the vehicle and the object can be avoided, for example, by an appropriate steering intervention, in particular by setting the maximum specifiable steering angle. In this case, it is not necessary to initiate a braking action. Thus, in situations where an avoidance manoeuvre is possible, the braking or emergency braking can be omitted. This allows the risk of rear-end collisions to be reduced.

In a further embodiment, the second collision avoidance measure is initiated if the current steering angle is within the warning steering angle range. If the current steering angle range is within the warning steering angle range, a measure can be implemented in order to avoid the collision. For example, an action can be carried out which causes the driver not to steer into the blocked steering angle range. This allows the driver to be informed of a possible collision with the object in good time.

In one embodiment an optical, an audible and/or a haptic warning signal is issued to a driver of the motor vehicle as the second collision avoidance measure. If the current steering angle is within the warning steering angle range, or the current steering angle is changed away from the warning steering angle range in the direction of the blocked steering angle range, a warning can be issued to the driver. For example, a visual warning can be output on a display element in the interior of the vehicle. In addition, it can be provided that an audible warning signal is output by means of a loudspeaker. Alternatively or additionally, a haptic warning signal can be issued to the driver. This haptic warning signal can be enabled, for example, with the aid of suitable actuators which are arranged on or in the steering wheel. The haptic warning signal can also be provided by a steering moment or torque applied to the steering wheel. Therefore, the driver can be warned of a potential collision with the object.

In a further embodiment a steering hint to the driver of the motor vehicle is output as the second collision avoidance measure. The warning and/or the second collision avoidance measure may comprise a steering hint to the driver of the motor vehicle. For example, it can be indicated to the driver how he/she should operate the steering wheel of the motor vehicle to avoid a potential collision between the motor vehicle and the object. This collision avoidance measure is particularly suitable in the case of a relatively long distance to the object or a short distance to the blocked steering angle range. This allows the driver to be informed of a possible collision with the object in good time. In this case, no intervention in the steering can yet take place, so that the operator is not unnerved by the steering intervention by the driver assistance system.

In a further embodiment, within the warning steering angle range a steering movement performed by the driver is detected, and if the detected steering movement is oriented in the direction of the blocked steering angle range, the second collision avoidance measure carried out is a steering intervention which is in the opposite direction to the steering movement. If the current steering angle is within the warning steering angle range, a steering movement carried out by the driver can be detected using suitable sensors, such as a steering angle sensor. If this steering movement leads in the direction of the blocked steering angle range, the driver assistance system can be used to perform an active intervention in the steering. For example, via the steering a moment can be applied in the opposite direction to the blocked steering angle range. Thus if the driver steers in the direction of the blocked steering angle range, an intervention may be made in the steering in such a way that the driver cannot steer the motor vehicle into the blocked steering angle range.

Preferably, the intensity of the steering intervention is determined as a function of a distance of the motor vehicle from the blocked steering angle range, a steering torque applied during the steering movement, and/or the current speed of the motor vehicle. The steering intervention can be used to provide a response, or feedback, to the driver of the vehicle. This feedback can be adapted, for example depending on the driving behaviour of the driver. It is also possible to adjust the intensity of the feedback depending on how far the motor vehicle is from the blocked steering wheel angle range. Here, the intensity can be increased with decreasing distance. The intensity of the feedback can also be adjusted depending on the steering torque which the driver applies. For example, the intensity can be increased with increasing steering torque. The intensity of the feedback can also be increased with increasing speed of the motor vehicle. The intensity of the feedback describes in particular the torque which is applied during the steering intervention. This allows the steering intervention to be reliably adapted to the current driving situation.

It is also advantageous if in the maximum specifiable steering angle range a free steering angle range is determined, for which there is no risk of collision with the object and which is adjacent to the warning steering angle range, and if a collision avoidance measure is prevented in the free steering angle range. The maximum specifiable steering angle range can thus be divided into the free steering angle range, in which there is no risk of collision with the object, and the blocked steering angle range, in which the collision will occur if the steering angle is maintained. Between the free steering angle range and the blocked steering angle range, the warning steering angle range is defined, for which a warning can be issued to the driver. The various steering angle ranges can be used to describe the risk of collision. Depending on the risk of collision, the appropriate necessary collision avoidance measure can then be initiated.

In a further embodiment, the second collision avoidance measure is initiated if the steering angle is changed from the free steering angle range into the warning steering angle range. The second collision avoidance measure can therefore only be initiated if a current steering angle which is located in the free steering angle range is changed into a steering angle which is located in the warning steering angle range. The warning is thus only provided in one direction, namely from a collision-free trajectory into the warning steering angle range, but not, for example, from a collision trajectory into the warning steering angle range. It can also be provided that the second collision avoidance measure is initiated if the steering angle is changed from the blocked steering angle range into the warning steering angle range. This can be the case, for example, after a steering intervention has been carried out as a first collision avoidance measure.

A driver assistance system according to the invention for a motor vehicle is designed to implement a method according to the invention. The vehicle can comprise, for example, a plurality of sensors with which the relative position between the motor vehicle and the object can be determined. Furthermore, the driver assistance system can have a control device which can determine the maximum specifiable steering angle range based on the relative position between the motor vehicle and the object, the current vehicle speed and/or the reaction time. In addition, the control device can be used to determine the blocked steering angle range, the warning steering angle range and/or the free steering angle range.

A motor vehicle according to the invention comprises a driver assistance system according to the invention. In particular, the motor vehicle is designed as a passenger car.

The preferred embodiments presented in relation to the method according to the invention and their advantages apply mutatis mutandis both to the driver assistance system according to the invention and to the motor vehicle according to the invention.

Additional features of the invention arise from the claims, the Figures and the description of the Figures. The features and feature combinations cited in the description above, and the features and feature combinations cited in the description of the figures below and/or shown in the figures alone are applicable not only in the respective combination indicated but also in other combinations or in isolation, without departing from the scope of the invention. Therefore, such embodiments of the invention are also to be considered as comprised and disclosed as are not explicitly shown or explained in the figures, but which emerge from and can be generated from the embodiments described by separate feature combinations. Embodiments and combinations of features are also to be regarded as disclosed, which therefore do not have all features of an originally formulated independent claim. Furthermore, designs and combinations of features, in particular those of the designs described above, which go beyond or differ from the feature combinations set out in the cross-references of the claims shall also be considered to be disclosed.

BRIEF DESCRIPTION OF THE SEVERAL VIEWS OF THE DRAWING(S)

The invention will now be described in greater detail based on preferred exemplary embodiments and by reference to the attached drawings.

These show.

In the Figures, identical and functionally equivalent elements are indicated by identical reference marks.

DETAILED DESCRIPTION OF THE INVENTION

Figure 1:
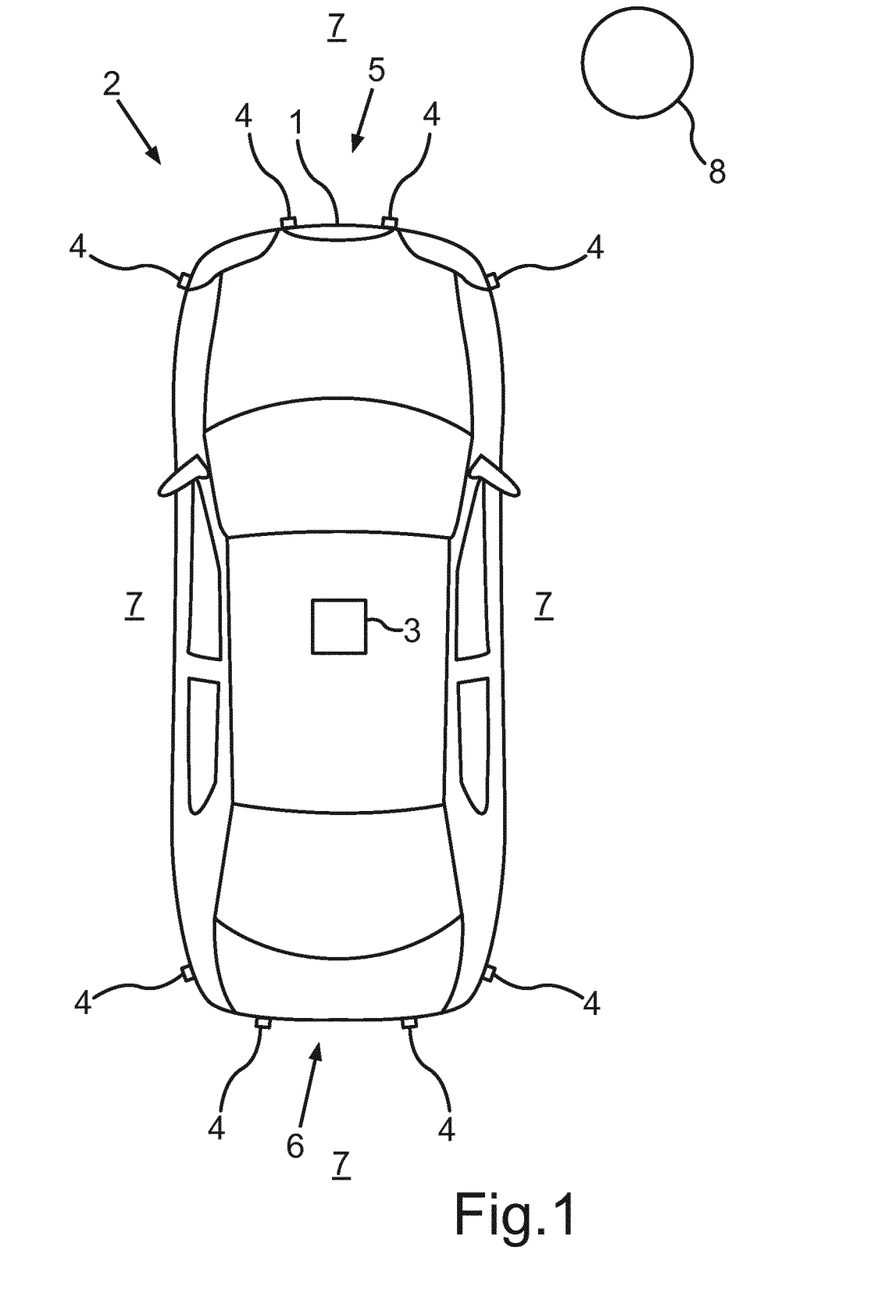
FIG. 1 a motor vehicle in accordance with one embodiment of the present invention, which has a driver assistance system.

FIG. 1 shows a motor vehicle 1 according to one embodiment of the present invention in a plan view. The motor vehicle 1 in the present case is designed as a passenger car. The motor vehicle 1 comprises a driver assistance system 2, which supports the driver in driving the motor vehicle 1.

The driver assistance system 2 comprises a plurality of sensors 4, which are distributed about the motor vehicle 1. There are four sensors 4 arranged in the front area 5 and four of the sensors 4 arranged in a boot area 6 of the motor vehicle 1. The sensors 4 can be ultrasound sensors. With the help of the sensors 4, objects 8 in an environment 7 of the motor vehicle 1 can be detected. The driver assistance system 2 also comprises a control device 3, which is connected to the sensors 4 for data transmission. Corresponding data lines are not shown in the present case for the sake of clarity. Using the control device 3, the data provided by the sensors 4 can be evaluated.

Figure 2:
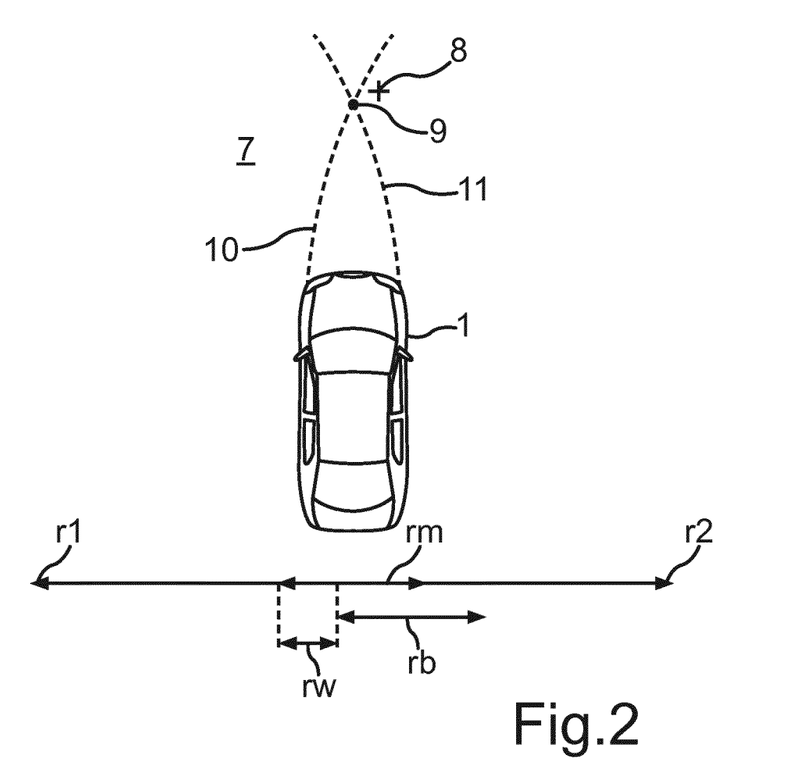
FIG. 2 a schematic representation of the motor vehicle and an object for explaining a process for determining the maximum specifiable steering angle range.

The driver assistance system 2 is designed to avoid a collision between the motor vehicle 1 and the object 8. For this purpose, a maximum specifiable steering angle range rm is determined. This is illustrated schematically in FIG. 2. FIG. 2 shows the motor vehicle 1, in the environment 7 of which the object 8 is located. In addition, the current speed of the motor vehicle 1 and a current steering angle of the motor vehicle 1 are determined. The steering angle describes an angle of the steerable wheels of the motor vehicle 1. In addition, a predetermined reaction time is stored in the control device 3. This reaction time can describe a reaction time of a driver of the vehicle. Alternatively, the reaction time can describe a response time of the driver assistance system.

Firstly, the maximum specifiable steering angle range rm must be determined. This maximum steering angle range rm describes the steering angles that can be set in the current driving situation. In principle, the steering angle can be varied between a first maximum possible steering angle r1 and a second maximum possible steering angle r2. The maximum possible steering angle r1 is obtained when the steerable wheels are fully turned to the left and the maximum possible steering angle r2 is obtained when the steerable wheels are fully locked to the right. In order to determine the maximum specifiable steering angle rm a virtual object 9 is used, which is located in the direction of travel in front of the motor vehicle 1, and for which maintaining the same direction of travel will risk a collision centrally with the front of the motor vehicle 1. This virtual object 9 is defined such that the collision threatens to occur after the reaction time. On the basis of this virtual object 9, trajectories 10 and 11 can then be determined, each of which describes a movement of the motor vehicle 1 which bypasses the virtual object 9. The motion path 10 describes the movement of a left front side of the motor vehicle 1 for the setting of a second maximum specifiable steering angle r2. The motion path 11 describes the movement of the right-hand front side of the motor vehicle 1 for the setting of the first maximum specifiable steering angle r1. From the first and second maximum specifiable steering angles r1, r2 the maximum specifiable steering angle range rm can then be determined, which extends between the first and the second maximum specifiable steering angle r1, r2.

Figure 3:
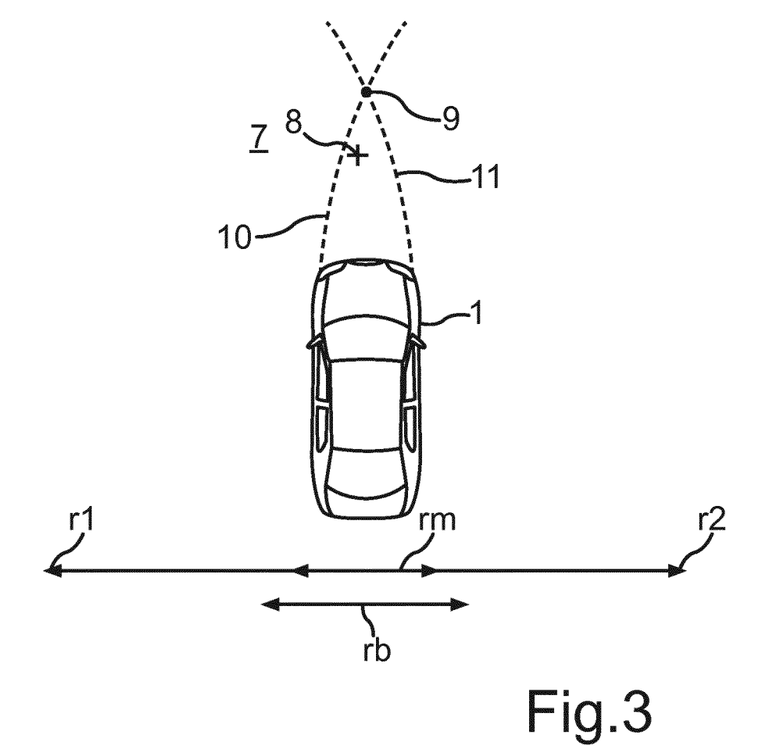
FIG. 3 a representation of the motor vehicle and of the object according to a further embodiment.

In addition, a blocked steering angle range rb is determined, which describes those steering angles the setting of which risks a collision with the object 8. The blocked steering angle range rb can be determined based on the relative position between the motor vehicle 1 and the object 8. In the example of FIG. 2, for the maximum specifiable steering angle range rm, which is different from the blocked steering wheel angle range rb, there is a possibility of avoiding the object 8 and thus avoiding a collision between the vehicle 1 and the object 8. In contrast to this, FIG. 3 shows an example in which the blocked steering angle range rb is greater than the maximum specifiable steering angle range rm. In the present case, the maximum specifiable steering angle range rm is completely within the blocked steering angle range rb. In this case, a collision between the vehicle 1 and the object 8 can no longer be avoided.

In the present case, a collision avoiding measure will be determined depending on the steering angle range. In the example of FIG. 3 the current steering angle of the motor vehicle 1 is in the blocked steering angle range rb and a collision can therefore no longer be avoided. In this case, a braking or a steering intervention is carried out as the first collision avoiding measure. For this purpose, using the control device 3 or the driver assistance system an intervention in either the brakes or the steering of the motor vehicle 1 can be carried out.

In the example of FIG. 2 it can be checked whether a current steering angle is within a predetermined warning steering angle range rw. This warning steering angle range rw describes steering angles, the setting of which will not risk a collision with the object 8, but a slight change to the steering angle of the steering angle or the steering wheel angle may lead to a collision with the object 8. If the current steering angle is within this warning steering angle range rw, a second collision avoiding measure can be initiated. For example, a warning can be issued to the driver of the motor vehicle 1. Alternatively, an intervention in the steering of the motor vehicle 1 can be performed by means of the driver assistance system 2 or the control device 3. Thus, the driver of the vehicle 1 can be prevented from operating the steering such that the current steering angle would lie within the blocked steering angle range rb.

Figure 4:
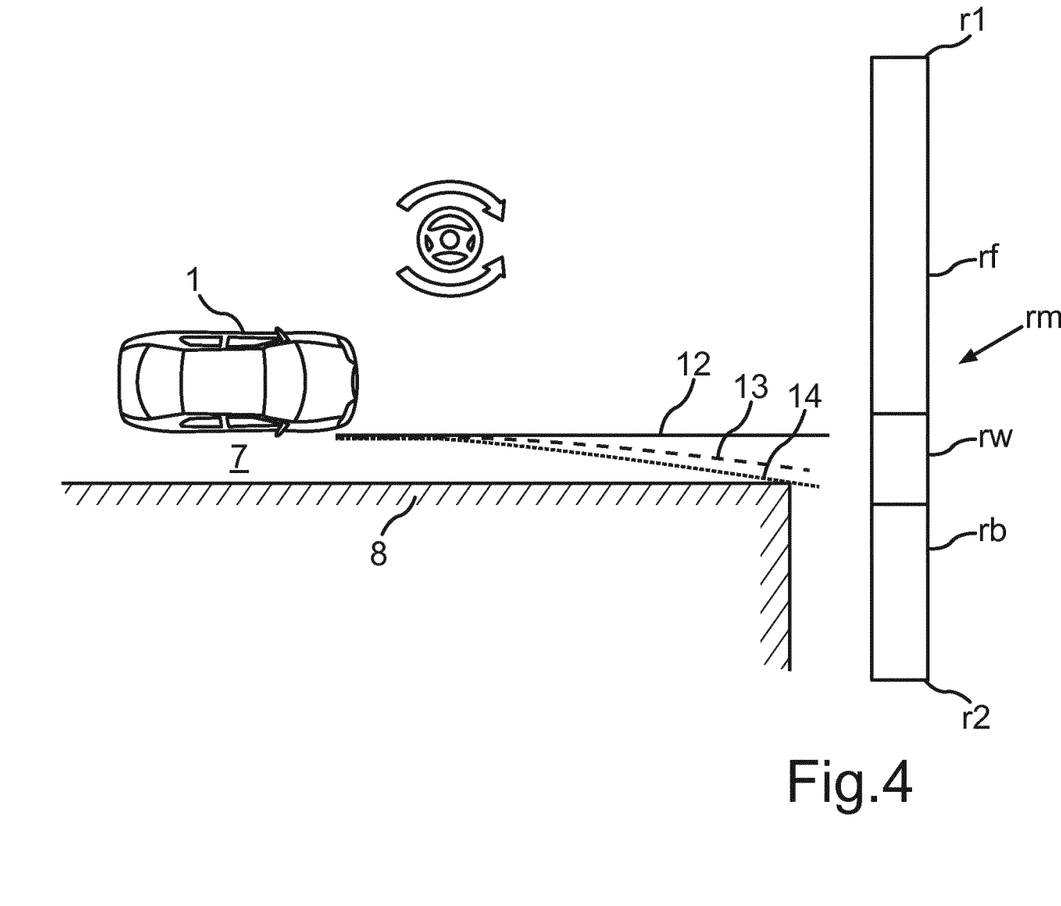
FIG. 4 a further schematic representation of the motor vehicle and an object.

FIG. 4 shows a schematic representation of the motor vehicle 1 and an object 8 in the environment 7 of the motor vehicle. Here also, the maximum specifiable steering angle rm is determined for the current driving situation. In doing so a free steering angle range rf is also defined, in which there is no risk of collision with the object 8. This free steering angle range rf is assigned to a first trajectory 12. If the current steering angle of the motor vehicle 1 is within the free steering angle range rf or the motor vehicle 1 is moving along the first trajectory 12, no collision avoiding measure is carried out. If the current steering angle of the motor vehicle 1 is within the blocked steering angle range rb, or the motor vehicle 1 is moving along the third trajectory 14, a braking or steering intervention is carried out as a first collision avoiding measure.

If the current steering angle is within the warning steering angle range rw or the motor vehicle 1 is moving along the second trajectory 13, a visual, audible and/or haptic feedback or warning can be issued to the driver. This warning or this prompt can indicate to the driver as to how he/she must adapt his/her driving behaviour. In the present case, the warning steering angle range rw can be determined by means of an additional safety distance, which is defined, for example, on the basis of the steering angle. As another type of feedback, an intervention in the steering can be made if the current steering angle is within the warning steering angle range rw. At the same time a steering movement of the driver can be detected. If a steering movement is detected in the direction of the blocked steering angle range rb, a steering torque can be applied in the opposite direction to this steering movement. This is a reliable way in which to prevent the driver from steering the vehicle 1 into the blocked steering angle range rb.

Figure 5:
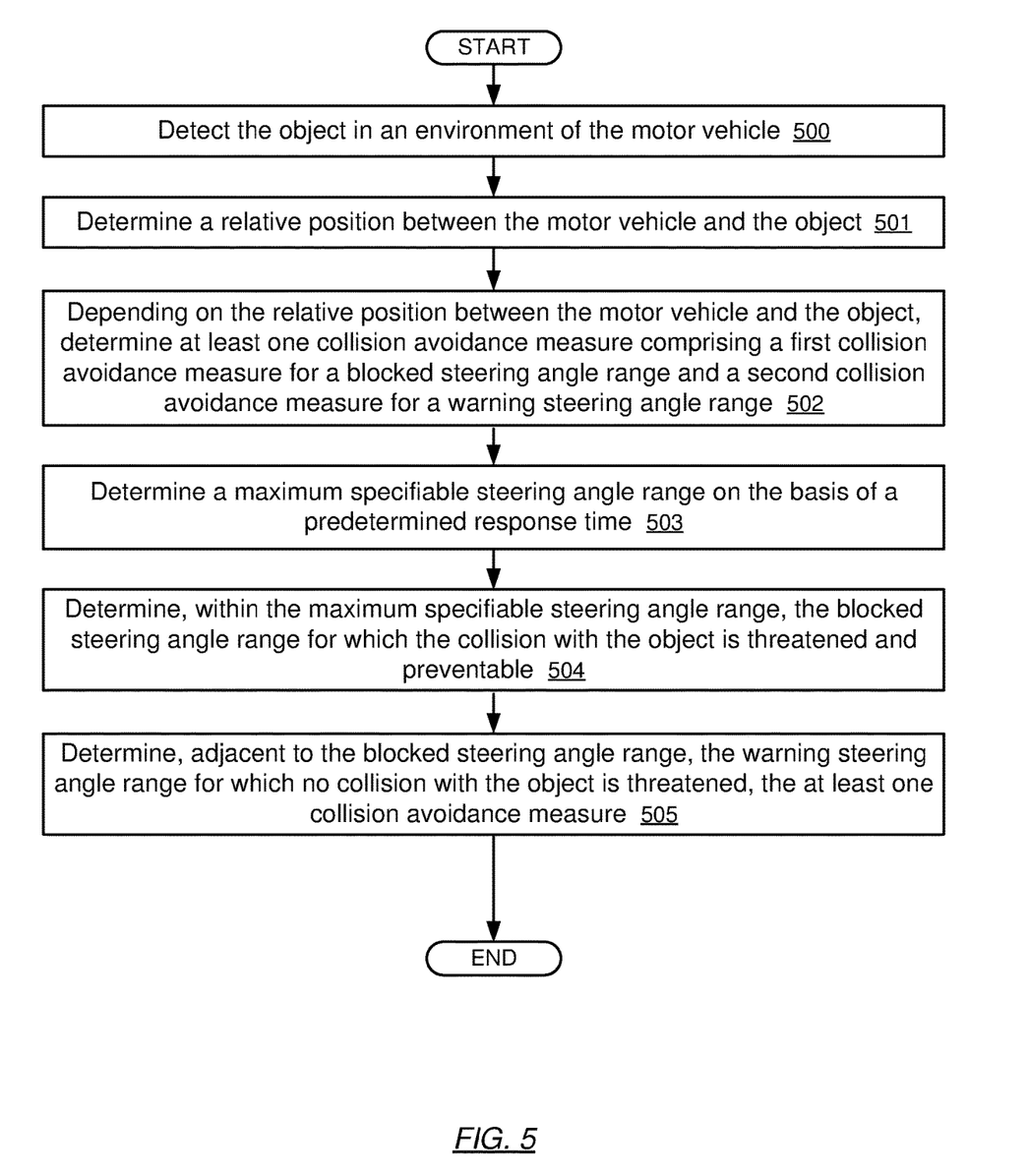
FIG. 5 a flowchart describing the methodology algorithm.

FIG. 5 shows a flowchart of the methodology algorithm based on the description of page 5 above.

The invention claimed is:

1. A method for avoiding a collision of a motor vehicle with an object, the method comprising:
    detecting the object in an environment of the motor vehicle;
    determining a relative position between the motor vehicle and the object; and
    depending on the relative position between the motor vehicle and the object, determining at least one collision avoidance measure by:
        determining a maximum specifiable steering angle range within which a blocked steering angle range is determined, for which the collision with the object is threatened and preventable, and a warning steering angle range adjacent to the blocked steering angle range is determined, for which no collision with the object is threatened, the at least one collision avoidance measure comprising a first collision avoidance measure for the blocked steering angle range and a second collision avoidance measure for the warning steering angle range,
        wherein the maximum specifiable steering angle range is determined on the basis of a predetermined response time,
        wherein the second collision avoidance measure is initiated if the current steering angle lies within the warning steering angle range, and
        wherein within the warning steering angle range a steering movement performed by the driver is detected, and if the detected steering movement is oriented in the direction of the blocked steering angle range, the second collision avoidance measure carried out is a steering intervention which is in the opposite direction to the steering movement.

2. The method according to claim 1,
    wherein the predetermined response time corresponds to a period of time between detection of the object and beginning of the at least one collision avoidance measure, and
    wherein the maximum specifiable steering angle range is determined further on the basis of a current speed of the motor vehicle.

3. The method according to claim 1, wherein a braking and/or steering intervention is determined as the first collision avoidance measure, and the first collision avoidance measure is initiated if a current steering angle lies within the blocked steering angle range.

4. The method according to claim 1, wherein a visual, an audible and/or a haptic warning signal is issued to a driver of the motor vehicle as the second collision avoidance measure.

5. The method according to claim 1, wherein the intensity of the steering intervention is determined as a function of a distance from the motor vehicle to the blocked steering angle range, a steering torque applied during the steering movement, and/or the current speed of the motor vehicle.

6. The method according to claim 1, wherein in the maximum specifiable steering angle range a free steering angle range is determined, for which there is no threatened collision with the object and which is adjacent to the warning steering angle range, and a collision avoidance measure is prevented in the free steering angle range.

7. The method according to claim 6, wherein the second collision avoidance measure is initiated if the steering angle is changed from the free steering angle range into the warning steering angle range.

8. A driver assistance system for a motor vehicle configured to:
    detect an object in an environment of the motor vehicle;
    determining a relative position between the motor vehicle and the object; and
    depending on the relative position between the motor vehicle and the object, determining at least one collision avoidance measure by:
        determining a maximum specifiable steering angle range within which a blocked steering angle range is determined, for which the collision with the object is threatened and preventable, and a warning steering angle range adjacent to the blocked steering angle range is determined, for which no collision with the object is threatened, the at least one collision avoidance measure comprising a first collision avoidance measure for the blocked steering angle range and a second collision avoidance measure for the warning steering angle range,
    wherein the maximum specifiable steering angle range is determined on the basis of a predetermined response time,
    wherein the second collision avoidance measure is initiated if the current steering angle lies within the warning steering angle range, and
    wherein within the warning steering angle range a steering movement performed by the driver is detected, and if the detected steering movement is oriented in the direction of the blocked steering angle range, the second collision avoidance measure carried out is a steering intervention which is in the opposite direction to the steering movement.

9. A motor vehicle having a driver assistance system according to claim 8, wherein the object is detected using a sensor arranged in a front area and/or a boot area of the motor vehicle.

10. A method for avoiding a collision of a motor vehicle with an object, the method comprising:
  detecting the object in an environment of the motor vehicle;
  determining a relative position between the motor vehicle and the object; and
  depending on the relative position between the motor vehicle and the object, determining at least one collision avoidance measure by:
    determining a maximum specifiable steering angle range within which a blocked steering angle range is determined, for which the collision with the object is threatened and preventable, and a warning steering angle range adjacent to the blocked steering angle range is determined, for which no collision with the object is threatened, the at least one collision avoidance measure comprising a first collision avoidance measure for the blocked steering angle range and a second collision avoidance measure for the warning steering angle range,
  wherein the maximum specifiable steering angle range is determined on the basis of a predetermined response time,
  wherein the second collision avoidance measure is initiated if the current steering angle lies within the warning steering angle range,
  wherein within the warning steering angle range a steering movement performed by the driver is detected, and if the detected steering movement is oriented in the direction of the blocked steering angle range, the second collision avoidance measure carried out is a steering intervention which is in the opposite direction to the steering movement, and
  wherein a steering hint is issued to a driver of the motor vehicle as the second collision avoidance measure.

* * * * *